US011919693B2

(12) United States Patent
Van Der Vegt et al.

(10) Patent No.: US 11,919,693 B2
(45) Date of Patent: Mar. 5, 2024

(54) BOTTLE CARRIER

(71) Applicant: NPK Design B.V., Leiden (NL)

(72) Inventors: Herman Van Der Vegt, Utrecht (NL); Janwillem Bouwknegt, Leiderdorp (NL); Jan De Boer, Amsterdam (NL)

(73) Assignee: NPK DESIGN B.V., Leiden (NL)

( * ) Notice: Subject to any disclaimer, the term of this patent is extended or adjusted under 35 U.S.C. 154(b) by 658 days.

(21) Appl. No.: 17/048,494

(22) PCT Filed: Apr. 23, 2019

(86) PCT No.: PCT/EP2019/060400
§ 371 (c)(1),
(2) Date: Oct. 16, 2020

(87) PCT Pub. No.: WO2019/202171
PCT Pub. Date: Oct. 24, 2019

(65) Prior Publication Data

US 2021/0214138 A1 Jul. 15, 2021

(30) Foreign Application Priority Data

Apr. 20, 2018 (EP) .................................... 18168535

(51) Int. Cl.
*B65D 71/50* (2006.01)
*B67B 7/16* (2006.01)

(52) U.S. Cl.
CPC ................ *B65D 71/50* (2013.01); *B67B 7/16* (2013.01)

(58) Field of Classification Search
CPC .... B65D 71/50; B67B 7/16; A45F 2200/0583
(Continued)

(56) References Cited

U.S. PATENT DOCUMENTS 1,974,255 A * 9/1934 Behrendt ............... B65D 71/50 294/87.24
2,080,947 A * 5/1937 Ligeour .................... B67B 7/16 294/99.1

(Continued)

FOREIGN PATENT DOCUMENTS

DE 29820341 U1 * 3/2000 ............ B65D 71/50
DE 202006012428 U1 3/2007

(Continued)

OTHER PUBLICATIONS

Intent to Grant in corresponding European patent application 19718415.3 dated Jan. 9, 2023.

(Continued)

*Primary Examiner* — Dean J Kramer
(74) *Attorney, Agent, or Firm* — Steven M. Kochler; Westman, Champlin & Koehler, P.A.

(57) ABSTRACT

A bottle carrier is configured to carry plural crown-cap bottles having a collared neck by their neck. The bottle carrier comprises a plurality of bottle holders connected to each other for each holding a crown-cap bottle along an axis of extension, wherein the connection of the bottle holders may be formed as a frame or a backbone. Each bottle holder comprises at least three resilient arms defining a holding space and configured to engage and hold the neck of the bottle and to support the bottle by the collar. The arms are further arranged to provide the bottle neck access into the holding space in radial direction, and to provide an effectively radially inward holding force onto the bottle neck.

22 Claims, 7 Drawing Sheets

(58) Field of Classification Search
USPC .............. 294/87.2, 87.28; 206/149, 159, 427
See application file for complete search history.

(56) References Cited

U.S. PATENT DOCUMENTS

| | | | | | |
|---|---|---|---|---|---|
| 2,301,594 | A * | 11/1942 | Voigtritter | B65D 71/50 294/99.1 |
| 2,841,435 | A | 7/1958 | Rochon | |
| 2,871,055 | A * | 1/1959 | Glazer | B65D 71/50 294/87.2 |
| 3,003,805 | A | 10/1961 | Glazer | |
| 4,360,231 | A * | 11/1982 | Bolin | B65D 71/50 294/87.2 |
| 5,452,794 | A * | 9/1995 | DiVietro | B65D 71/42 206/427 |
| 5,467,870 | A * | 11/1995 | Broskow | B65D 71/0025 206/427 |
| 2006/0086063 | A1 | 4/2006 | Magomedov | |
| 2007/0039836 | A1* | 2/2007 | Borg | B65D 71/50 206/150 |
| 2009/0308763 | A1 | 12/2009 | Oster | |
| 2015/0191287 | A1* | 7/2015 | L'Heureux | B65D 71/50 206/476 |

FOREIGN PATENT DOCUMENTS

| | | | | |
|---|---|---|---|---|
| EP | 0521572 | A1 | 1/1993 | |
| EP | 1251078 | A2 * | 10/2002 | A45F 5/10 |
| FR | 2590942 | A1 | 6/1987 | |
| JP | 2003237831 | A | 8/2003 | |
| WO | WO-2008084335 | A1 * | 7/2008 | B65D 71/50 |

OTHER PUBLICATIONS

International Search Report and Written Opinion for PCT Patent Application No. PCT/EP2019/060400, dated Jul. 24, 2019.

* cited by examiner

BOTTLE CARRIER

CROSS REFERENCE TO RELATED APPLICATIONS

This Application is a Section 371 National Stage Application of International Application No. PCT/EP2019/060400, filed Apr. 23, 2019 and published as WO 2019/202171 on Oct. 24, 2019, in English, the contents of which are hereby incorporated by reference in their entirety. This application further claims priority to European Patent Application No. 18168535.5, filed Apr. 20, 2018.

TECHNICAL FIELD

The present disclosure relates to storage and transport of bottles, in particular to packaging of bottles for storage and/or transport and more in particular to a package, a bottle carrier and a method of packaging bottles. The bottle carrier may be particularly for bottles having caps of the "crown"-type, which may be lift-off caps and/or screw-off caps.

BACKGROUND

Beverages such as mineral water, soft drinks, fruit juices and beer, are regularly packed in portion-sized bottles, and sold in sets of a plurality of bottles commonly packaged in crates and/or in set packages. For empty bottles a return system may be in place, re-using the supply crates.

However, crates are heavy and bulky objects and the regular number of bottles in a crate (typically 24 bottles) may be larger than a user's need.

Bottle holders other than crates are also known on the art e.g. EP 0 521 572 discloses a plastic holder, which serves to hold bottles at the neck side, comprises one or more flanges directed downward from a top limit and forming at least one compartment for taking at least one bottle neck. Opposite each other on the inside of each compartment near the free edges of the bottles are holding elements which can grip directly below a thickened neck part on the top side of a bottle neck, in order to hold it in position. Each compartment can be provided with an opening bounded by flange edges, through which a bottle can be inserted laterally. Connecting parts can be provided between different compartments. Supporting faces and positioning edges can be provided on the holder for interlinked stacking of several holders. For purposes of stacking holders containing bottles, thickened parts can be provided on the top side of the holder.

US 2006/0086063 is directed to means for storing or transporting articles and, in particular, to packaging elements and packaging of articles connected using packaging elements into packaging for convenient storing and transporting, as well as to portable devices having dividing compartments for several items, for example, such as bottles. The essence according to US 2006/0086063 is a method for packaging a set of bottles comprises stocking bottles with orientation of their bottlenecks with caps in one direction and connecting the stocked bottles by means of fixing them with packaging with grasping by the cap on each bottleneck. The bottles are fixed within the packaging in the position of opening of the cap when the bottle is extracted from the packaging.

U.S. Pat. No. 2,080,947 discloses a device for conveniently carrying a number of bottles, in the form of a bottle carrier and cap remover.

Further bottle carriers are known from DE 20 2006 012 428, JP 2003-237831, US 2009/0308763, FR 2 590 942, and U.S. Pat. No. 3,003,805.

Improvements over such known bottle carriers and over crates are desired. For this, it is useful to note and exploit the following facts: crown-capped bottles can be divided in a top portion and containment portion. The top portion comprises a circumferential bead or screw-thread as a topmost portion of the neck, to be engaged by the cap for closing the bottle, and a collar underneath the bead or screw-thread, respectively. Nearly all crown-capped bottles adhere to one of a few (effectively only two) de facto global industry standard sizes and shapes for the top portion of the bottle neck. Therefore, variations in shapes of individual bottles are effectively limited to the containment portion of the bottle underneath the collar.

SUMMARY

In view of the above, hereby a bottle carrier and an assembly are provided as set out below.

The bottle carrier is configured to carry plural crown-cap bottles having a collared neck by their neck. The bottle carrier comprises a plurality of bottle holders connected to each other for each holding a crown-cap bottle along an axis of extension, wherein the connection of the bottle holders may be formed as a frame or a backbone. Each bottle holder comprises at least three resilient arms defining a holding space and configured to engage and hold the neck of the bottle and to support the bottle by the collar. The arms are further arranged to provide the bottle neck access into the holding space in radial direction, and to provide an effectively radially inward holding force onto the bottle neck.

The radial access may allow for snapping the bottle holder onto the bottle neck by relative movement in radial direction. In reverse, the arms being resilient allows snapping the bottle holder off from the bottle neck by relative movement in radial direction.

Providing three or more arms facilitates providing a radial force direction and/or a force normal to the bottle neck in plural directions around the axis by appropriate direction of the arms, thus enhancing robustness and reliability of the carrier.

Further, (freedom of) movement of the bottle in the bottle holder may be reduced. The latter may facilitate user comfort during transport of bottles in the carrier and it may facilitate control over bottles when stacking assemblies of bottles and the carriers, further discussed below.

The arms may extend generally in axial direction and be formed generally as radial and/or circumferential portions and/or they may be distributed evenly spaced around the axis. Two of the arms may be arranged opposite each other, which may provide a symmetric clamping force. One of the arms may be arranged diametrically opposite an opening between arms providing the bottle neck access relative to the axis; this may increase control of at least one of position, orientation and movement of a bottle in the bottle holder.

Generally, in normal operation the axis of extension would extend vertically for storing and/or transporting a bottle upright and horizontally for a bottle lying on its side.

Thus, due to the bottle holder geometry, holding the bottle by the neck and supporting it on the collar, allows (the neck of) a bottle to enter and/or exit the holding space in a generally horizontal direction and carrying the bottle upright. Also, the bottle may be held both capped and uncapped, thus enabling holding and/or carrying full bottles and empty bottles for return. Both one-way and returnable bottles may be carried.

The bottle carrier may comprise any suitable number of bottle holders. Preferred may be an even number which may facilitate symmetric loading of the carrier. Also or alternatively, a number and a mutual spacing corresponding to a regular portion of a standard crate may be provided. E.g., the carrier may comprise 2, 4, 6, 8 bottle holders. Other numbers and arrangements may also be provided, e.g. 9 bottles arranged in an array shape (3×3) or 12 bottles (2×6 or 3×4).

The bottle holder may be symmetric about a symmetry plane containing the axis. This may improve design and manufacture of the carrier, notably with respect to distribution of forces encountered by (the bottle holder of) the bottle carrier and it may suggest and/or improve use of the bottle holder in an intended manner.

At least one of the arms may comprise an angled axial end to provide the bottle neck access into the holding space in axial direction.

The axial access may allow for snapping the bottle holder onto the bottle neck by relative movement in axial direction. This may facilitate top down assembly of bottles and bottle carriers, e.g. for automated assembly at a filling line.

In reverse, the arms being resilient may allow snapping the bottle holder off from the bottle neck by relative movement in axial direction. However, it is preferred that the arms are formed to latch onto the collar, significantly hindering axial removal of the bottle (neck) from the holding space.

At least one of the arms, preferably each arm, may comprise at least one of a circumferentially curved contact rib and a series of protrusions providing a circumferentially curved contact trace, the curvature preferably being in accordance with the circumference of the bottle.

NB: terms like "axial", "radial", "circumferential" etc. relate to cylinder coordinates with respect to the axis.

Such circumferential contact may increase a holding force onto the bottle and/or increase an engagement and/or support surface underneath the collar. Thus, holding and/or carrying forces may be suitably increased.

The combined circumferential contacts may e.g. extend over about ⅛th or more of the circumference of the bottle neck just below the collar. A larger contact may increase holding force.

The bottle holder geometry may closely follow the size and shape of the bottle neck for improving hold of and/or control over the bottle relative to the bottle holder.

In the carrier, all bottle holders may be substantially identical although different bottle holders, e.g. for different bottle sizes, may be provided.

At least some, preferably all, bottle holders of the carrier may be arranged such that they are accessible for entering/exiting of a bottle into the respective bottle holder in a radial direction independently and/or essentially freely e.g. independently from other bottle holders and/or other bottles held in the carrier. The openings of least some, preferably all, of the bottle holders may be directed outward from the frame or backbone and/or from a center of the bottle carrier, possibly generally radially outward from such center. Different orientations of (the arms and/or openings of) the bottle holders may further provide robustness with respect to carrying and/or stacking the bottles by providing nonparallel directions of weakest holding forces.

At least one of the bottle holders may comprise a cap lifter. The cap lifter may be integrated in the bottle holder such that the bottle may be opened and removed from (the bottle holder of) the carrier in substantially one movement.

Further, a bottle carrier is provided, being a bottle carrier for carrying plural bottles having a collared neck, the bottle carrier comprising a plurality of connected bottle holders, e.g. being connected to a backbone, for each holding a bottle along an axis of extension, each bottle holder defining a holding space and being configured to engage and hold the neck of the bottle and to support the bottle by the collar, wherein at least one of the bottle holders comprises an integrated cap lifter. This bottle carrier may be a bottle carrier as discussed above. In this bottle carrier, the cap lifter comprises a curved cap lifting edge having a curvature outward of the holding space (in a direction corresponding to the circumference of the bottle).

Such curved cap lifting edge may cause interaction with plural outward folds (or: "teeth") of a crown cap, increasing hold onto the cap for opening and increasing robustness of the lifting edge for repeated use of the lifter and/or the carrier as a whole. A straight cap lifting edge, although being an acceptable option, will generally interact with a single fold and risk rapidly wearing out.

The bottle holder preferably is configured such that, when the bottle is held and carried by the bottle carrier, the, possibly curved, cap lifting edge does not engage the cap, and such that at least part of the bottle must be and may be displaced relative to the lifting edge at least in axial direction against a holding force of the bottle holder onto the bottle in order to bring the lifting edge and the cap into contact for opening the bottle (see also below). This increases robustness against accidental (partial) opening of the bottle during transport and/or storage of an assembly of the carrier and a capped bottle held in a bottle holder of the bottle carrier. Also, the bottle may be removed more easily from the bottle holder without opening the bottle, if so desired. The displacement may comprise displacement in axial direction and/or tilting the bottle relative to the axis, possibly in a plane containing the axis.

A curved cap lifting edge may have a radius of curvature in a plane perpendicular to the axis larger than the radius of curvature of the bottle neck. The radius of curvature of the curved cap lifting edge may be in a range of 1.25-5 times the radius of the bottle neck at a location at or just below the cap. The curvature may form a tangent to the bottle neck radius. Also or alternatively, the radius of curvature of the curved cap lifting edge may be centered about a center being laterally offset from the axis opposite from the cap lifting edge in a range of 1.25-5 times the radius of the bottle neck at a location at or just below the cap. Instead of the radius of the bottle neck at a location at or just below the cap, the radius of curvature of the curved contact rib and/or that of the circumferentially curved contact trace provided by the series of protrusions, discussed above, may be used.

The cap lifting edge may extend over a width of about 20% of the bottle neck diameter and/or over an angular range of about 30 degrees or more about a center of curvature of its curved edge. This may further ensure engagement of the lifting edge with plural outward folds (or: "teeth") of a crown cap.

The cap lifting edge may be axially aligned with one of the arms and/or integrated in one of the arms. This facilitates focusing and/or balancing forces in the carrier, increasing robustness of the carrier. Further, this allows individual movement and/or deformation of the arm associated with the lifting edge and of the remaining arms, therewith accommodating tilting of the bottle for opening and balancing forces between a holding force onto the bottle and forces for opening the bottle and/or forces urging the bottle out of the bottle holder due to deformation of the holding space under influence of a bottle tilt.

The bottle holder may comprise a recess bordering the cap lifting edge for accommodating a cap crown and/or a bottle rim of a tilted bottle top in the holding space. This allows providing a combination of a high bottle holding force and reliability for opening the bottle. The recess may extend for a width of about half the bottle diameter centered about a middle line, e.g. a line crossing the axis and/or a symmetry line of the bottle holder. At least part of a transition from the recess to the cap lifting edge may be bevelled and/or chamfered to reduce build-up and/or concentration of stress due to forces for opening a bottle.

The bottle holder may comprise an at least partial top cover. This may protect the cap from tampering and/or damage. Further, the top cover may serve as a support for another bottle stacked on the carrier, as further expounded below. Also, the top cover may connect two or more of the arms, e.g. extending from one arm to another arm in a plane generally parallel to the axis, or at least a generally in axial direction. Thus, the arms may be connected both in circumferential direction and in a more axially oriented direction, so that the arms and/or the bottle holder as a whole may be fortified and/or so that a holding force of the bottle holder onto a bottle may be increased. Further, by the grip and/or by the shape of the top cover covering the top of a bottle when held in the bottle holder the top cover may assist in retaining a desired relative position of the bottle and bottle holder. This may improve display uniformity and/or stacking stability (see also below).

The at least partial top cover may further provide at least an edge and/or rib and contact portions on opposite sides of the axis. The edge and/or rib may be curved, preferably then having a curvature in a direction of the cap lifting edge. At least one of the edge and/or contact portions, where applicable, may be arranged for engaging the cap of a capped bottle in the holder in axial direction aligned with the bottle wall, thus enabling clamping the cap in axial direction between on the one side the edge and/or contact portion and on the other side the bottle wall. Thus, the cap lifter may comprise on one side of the cap the cap lifting edge for positioning, and on an opposite side the respective edge and/or rib and/or contact portions of the top cover. Such arrangement with a rib, edge and/or contact portions is considered superior to a deforming portion engaging the cap at or near a center of the cap, e.g. axially.

The bottle holder may comprise at least one radial inward protrusion for engaging, and/or interlocking with, a cap of a bottle held in the bottle holder. This assists defining a rotational position of the bottle relative to the carrier.

The bottle carrier may comprise an upper side provided with a stacking profile, the stacking profile comprising one or more of protrusions and recesses for engaging and at least partly defining a position of a bottle bottom placed onto the upper side. At least part of the stacking profile may be integrated in an optional top cover. Thus, bottles may be placed atop a bottle carrier, and in particular atop an assembly of the carrier and a number of bottles held in (the bottle holders of) the bottle carrier. The upper bottles may be (and preferably: are) themselves part of an assembly of the carrier and a number of bottles held in (the bottle holders of) another bottle carrier, the latter preferably being also a bottle carrier as disclosed herein and in particular being identical to the carrier of the assembly underneath.

The bottle carrier may comprise a hand grip, which may be at least partly foldable with respect to at least part of a bottle holder and/or of a frame or backbone. A hand grip may facilitate carrying the carrier. The grip may be accessible from above. The hand grip may comprise one or more apertures and/or recesses for gripping with one or more fingers. The hand grip may also be formed as a handle for gripping with an entire hand, or in any suitable other form. An at least partly foldable hand grip allows providing a relatively large hand grip in a relatively small space when folded.

The bottle carrier may comprise a container for containing caps removed from one or more of the bottles. The container may be provided with one or more openings at or near an underside to prevent collection of liquid and/or dirt. This may prevent spilling of caps and/or facilitate returning of caps of opened bottles for recycling.

In accordance with the above, herewith an assembly is provided comprising a bottle carrier as disclosed herein and a number of bottles held in bottle holders of the carrier.

The assembly may further comprise a packaging wrap around at least some of the bottles. Preferably the packaging wrap is fixed to the at least some of the bottles and/or the carrier. The packaging wrap may be opaque, preventing light struck of the wrapped bottle(s) and/or its/their contents. An opaque packaging wrap further may improve providing advertising space. The packaging wrap may comprise one or more resilient members, the resilient members engaging part of at least one of the bottles and/or the bottle carrier for fixing the wrap relative to at least one of the bottle carrier and one or more of the bottles.

Preferably, the bottles can be removed from the wrap and the carrier and/or returned into the wrap and the carrier without destroying at least part of the packaging wrap, allowing reuse of the intact part packaging wrap.

Summarizing, a bottle carrier and organiser with integrated bottle opener is provided herewith to carry easily and comfortably a number of bottles, e.g. 2/4/6 or more bottles. With the provided bottle carrier, it is possible to hold and control bottles, possibly even fix and/or orient bottles to the carrier, the bottles being provided with a crown cap or without it (the cap having been removed), thus offering a transport solution for both one-way and returnable bottles. The bottle holder geometry may be defined as narrow as possible around the bottle neck and cap to reduce and/or avoid one or more of wobbling, rattling, bouncing and touching of the bottles during transport.

The opener geometry allows capped and uncapped bottles to enter and/or to exit along a plane generally parallel to a main plane of the carrier, e.g. a plane comprising the aforementioned frame or backbone. In addition, the carrier and the opener in it can also be assembled in a vertical direction onto the (un)capped bottle, e.g. for top down assembly at a filling line or -station.

The carrier enables a safe and stable transport of full and/or empty bottles with good hold and possible fixation which result in a minimal bottle movement.

In comparison with existing plastic crates, the carrier offers the same functionality as bottle organiser, stacking assist and pack carrier However, the carrier may reduce use of manufacturing material, e.g. plastics, compared to crates. Embodiments shown and discussed herein, when manufactured of the same type(s) of plastics commonly used for bottle crates, may reduce the plastic use with 70% to 80% by weight of plastic per bottle held and transported in the crate or carrier, respectively. The transport volume of the bottle carrier without bottles may be reduced to 10% or below, e.g. even down to only 4% of the volume of a crate, for an equal number of bottles. The corresponding weight reduction per bottle will also allow more bottles to be transported in a standard size shipping container before reaching the maximum container loading and/or volume.

The carrier may serve for multiple use as a returnable carrier. The carrier may be monolithic and/or of one type of material, in particular a (recycled) plastic material, without requiring material combinations and/or assembly of separate parts. Thus, product and/or material recycling may be optimally exploited.

BRIEF DESCRIPTION OF THE DRAWINGS

The above-described aspects will hereafter be further explained with more details and benefits, with reference to the drawings showing a number of embodiments by way of example.

DETAILED DESCRIPTION OF EMBODIMENTS

Figure 1:
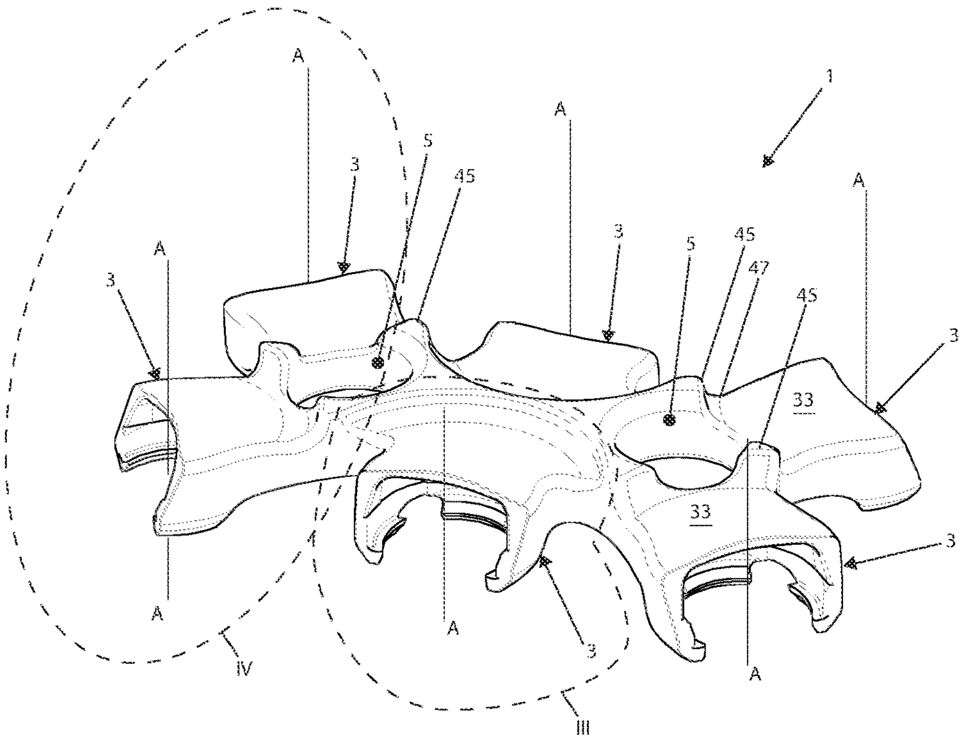
FIGS. 1, 1A and 2 show embodiments of bottle carriers.

It is noted that the drawings are schematic, not necessarily to scale and that details that are not required for understanding the present invention may have been omitted. The terms "upward", "downward", "below", "above", and the like relate to the embodiments as oriented in the drawings, unless otherwise specified. Further, elements that are at least substantially identical or that perform an at least substantially identical function are denoted by the same numeral, where helpful individualised with alphabetic suffixes.

Further, unless otherwise specified, terms like "detachable" and "removably connected" are intended to mean that respective parts may be disconnected essentially without damage or destruction of either part, e.g. excluding structures in which the parts are integral (e.g. welded or moulded as one piece), but including structures in which parts are attached by or as mated connectors, fasteners, releasable self-fastening features, etc.

Figure 2:
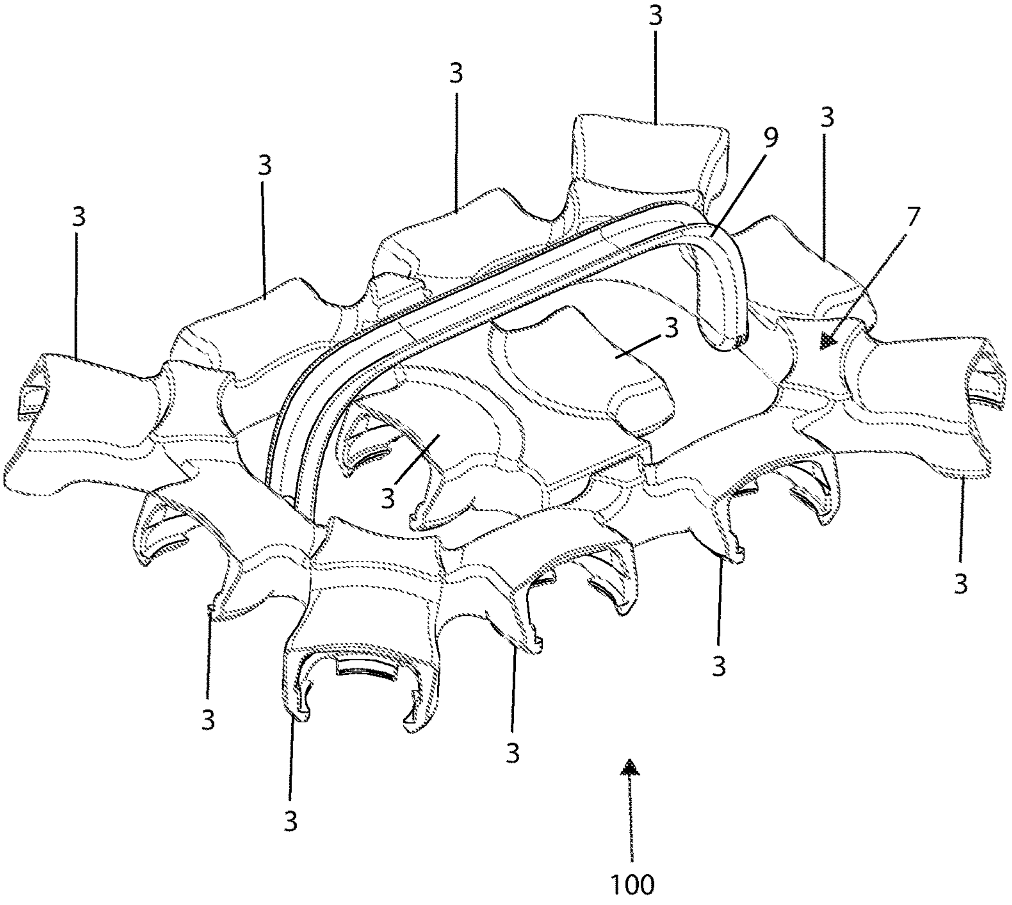
Figure 1A:
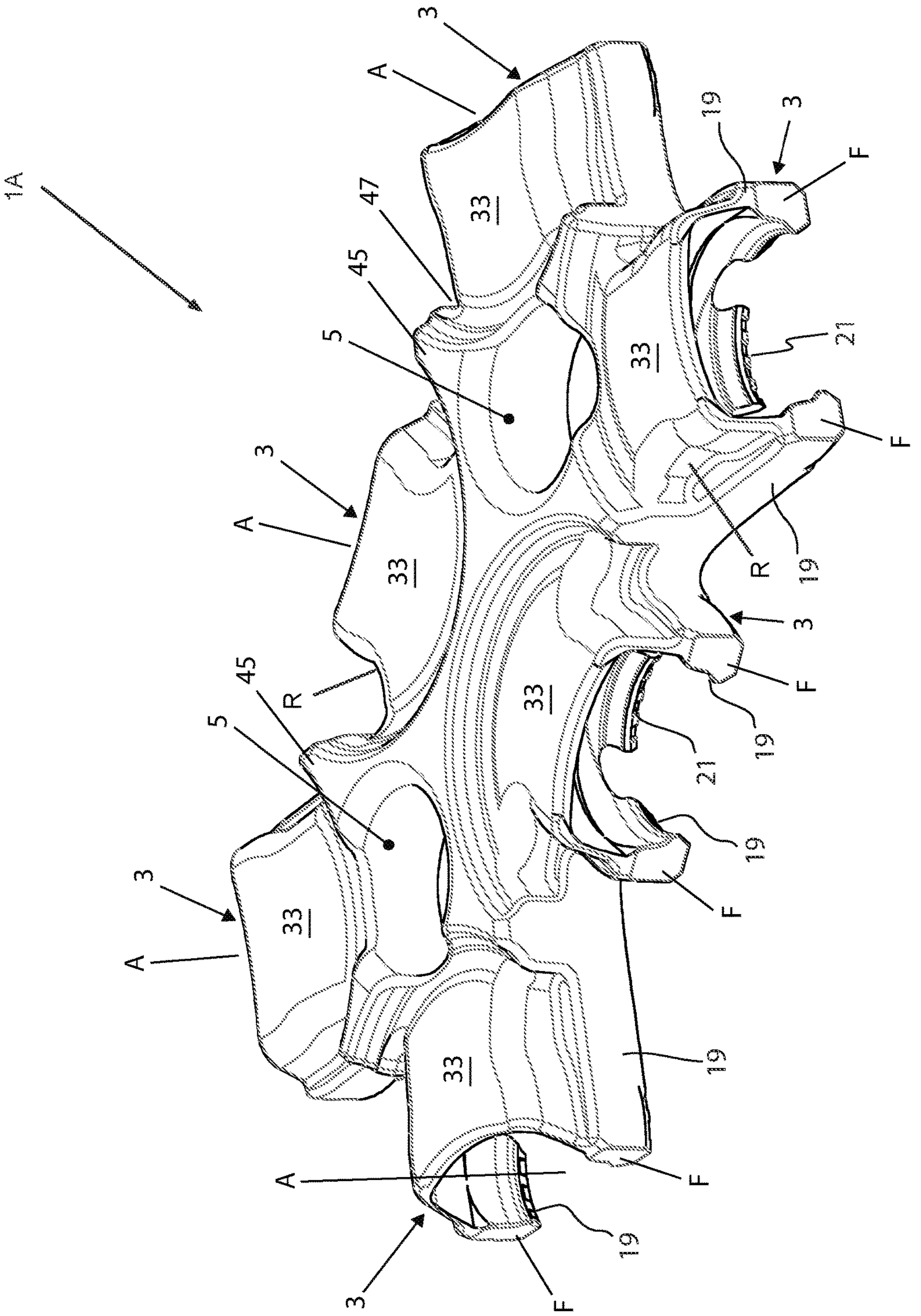

FIG. 1 shows a bottle carrier 1 for carrying 6 bottles (in an array of 2 rows of 3 bottles), each bottle (not shown in FIG. 1, but see below) having a collared neck. The bottle carrier 1 comprises 6 bottle holders 3 connected to each other for each holding a bottle along a respective axis of extension A, all axes A being parallel here. The connection of the bottle holders 3 may form a frame or a backbone. FIG. 1A shows a variant 1A of the carrier 1 of FIG. 1, differences being discussed below. FIG. 2 shows an embodiment of a bottle carrier 100 for carrying 12 bottles (in an array of 3 rows of 4 bottles). The shown bottle holders 3 are the same as bottle holders 3 of FIG. 1.

The bottle carrier 1 of FIG. 1 comprises two openings 5 in the backbone providing a finger hold as a form of a hand grip. The bottle carrier 100 of FIG. 2 comprises a main body 7, comprising the bottle holders 3, and a carrying handle 9 that is hinged to the main body 7, thus being foldable with respect to the main body 7.

Figure 3:
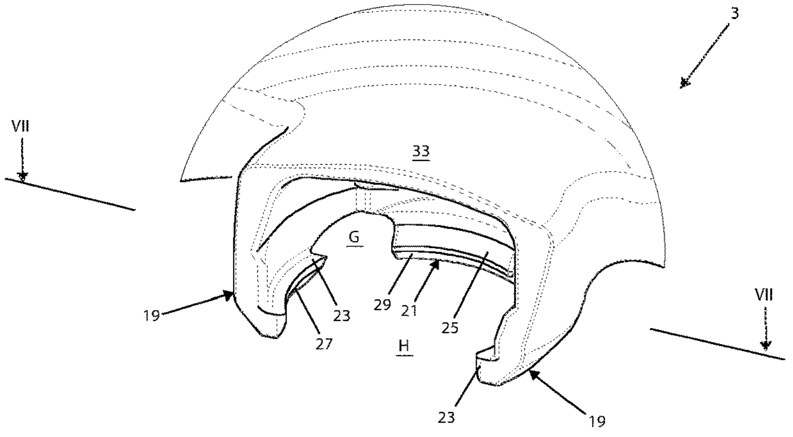
FIG. 3 shows portion III of FIG. 1.
Figure 4:
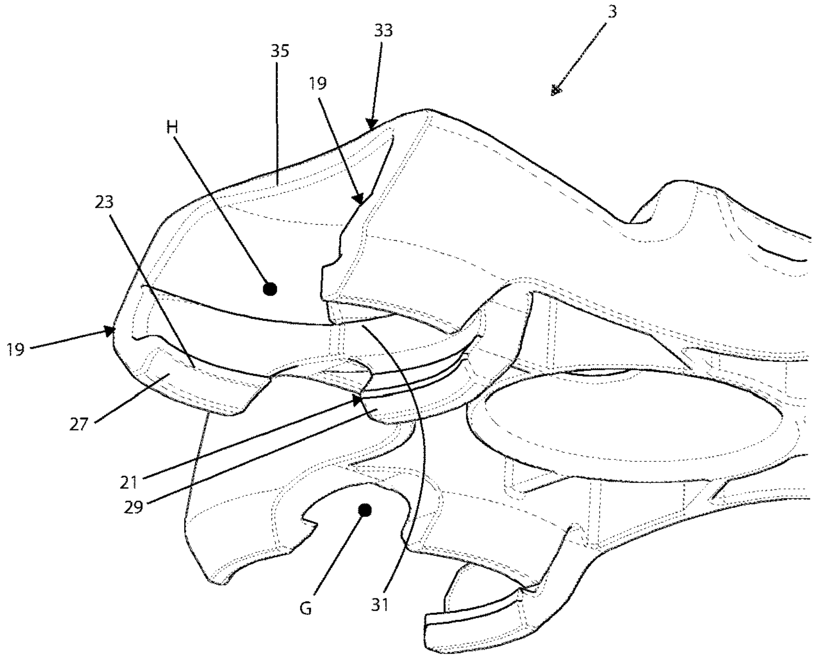
FIG. 4 shows a portion IV of FIG. 1 from another view point.
Figure 5:
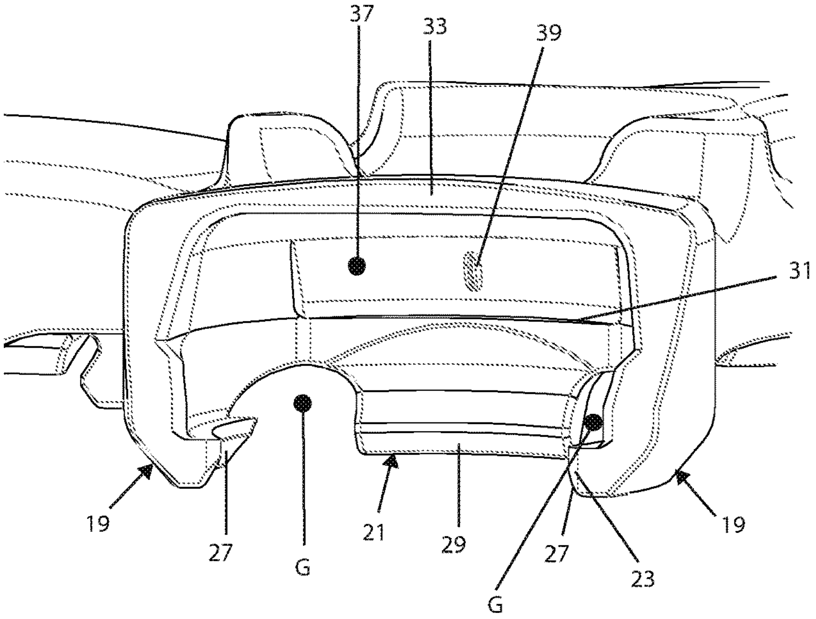
FIG. 5 shows portion III of FIG. 1 from another view point.
Figure 6:
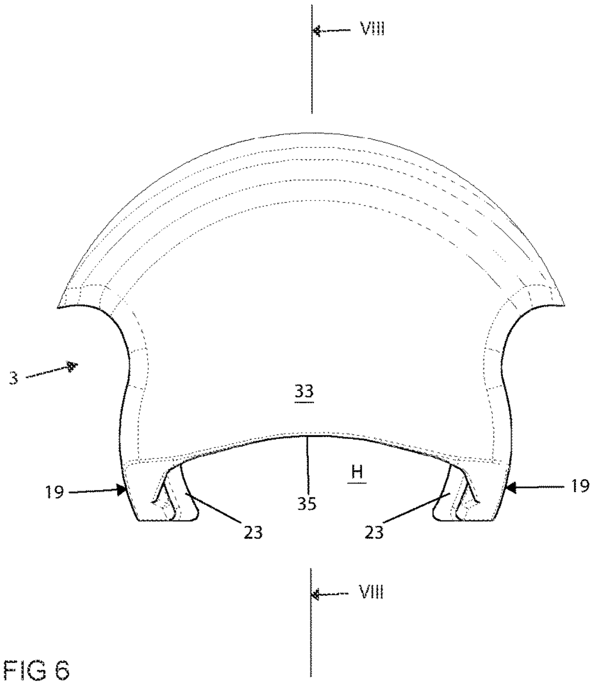
FIG. 6 shows portion III of FIG. 1 from yet another view point.
Figure 7:
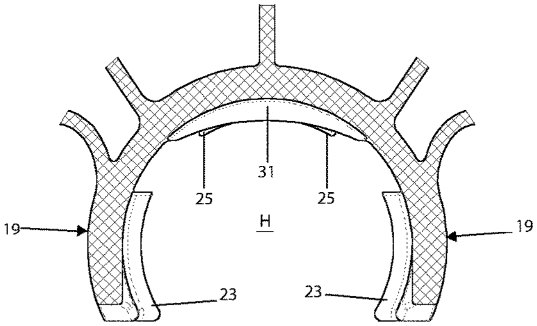
FIGS. 7 and 8 are cross section views as indicated with "VII" and "VIII" in FIGS. 3 and 6, respectively.
Figure 8:
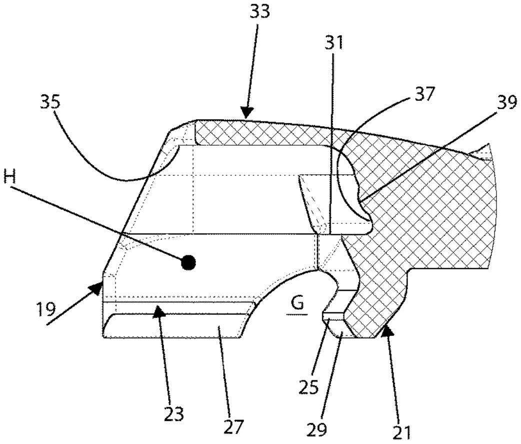

FIGS. 3-5 are various perspective views of a bottle holder 3; FIG. 6 is an axial top view of a bottle holder 3 and FIGS. 7 and 8 are cross section views of a bottle holder 3 as indicated with "VII" and "VIII" in FIGS. 3 and 6, respectively.

Figure 9:
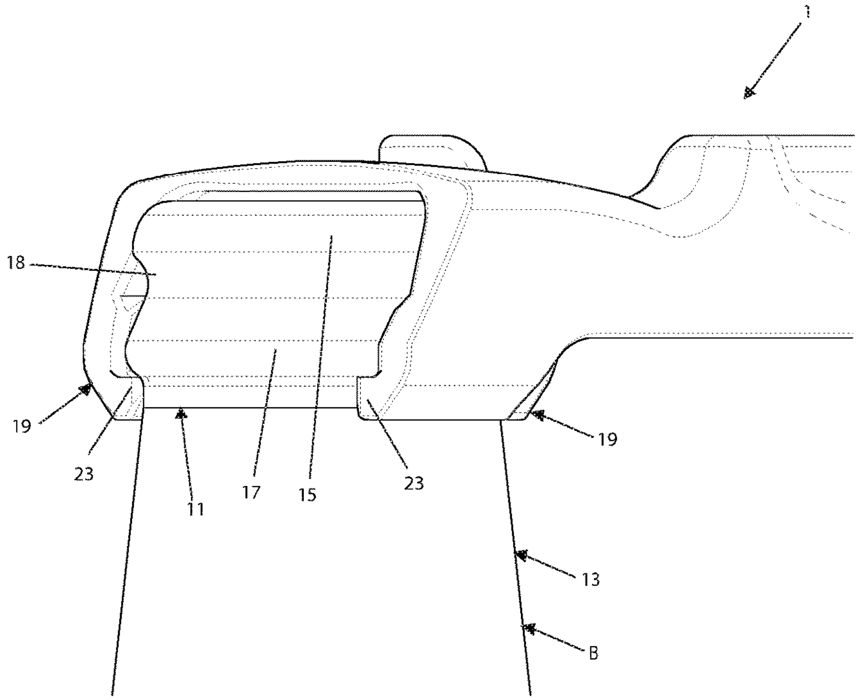
FIGS. 9 and 10 show part of a bottle neck held in a bottle holder of the carrier of FIG. 1.
Figure 10:
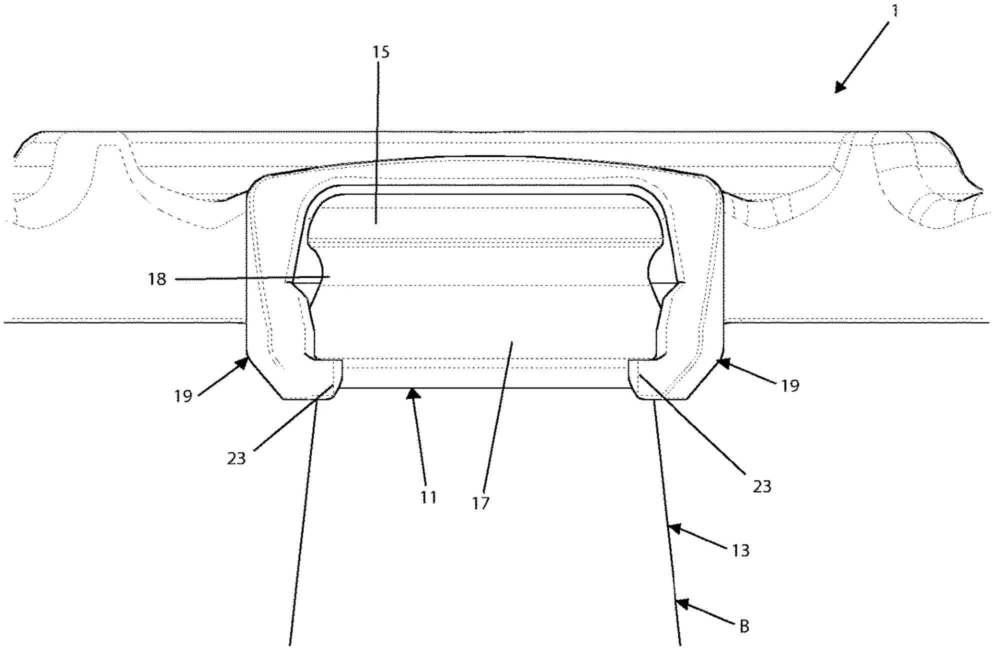

Best seen in FIGS. 9-10 and commonly known, the top portion 11 of the neck 13 of a crown-cap-bottle B (bottle only partly shown) comprises a bead 15 and a collar 17 separated by a waist 18. The crown cap (not shown) may fit over the bead 15 and grip the bead 15 to close the bottle B.

Each bottle holder 3 comprises three resilient arms 19, 21 extending generally in axial direction. The arms 19, 21 together define a holding space H and they are configured to engage and hold the top portion 11 of the bottle neck 13 and to support the bottle B by the collar 17 of the neck 13, by gripping and supporting the collar 17 from below (e.g. see FIGS. 9-10). For this, the arms 19 comprise an inwardly protruding rib 23 having a barb-shape and the arm 21 comprises an inwardly protruding rib 25 which may be of the same shape or, as shown, of a different shape than barb rib 23, e.g. being slightly rounded in axial direction as shown. As shown in FIG. 1A, all ribs 23, 25 may be rounded, e.g. in accordance with a shape in axial direction of the neck 13 (and possibly the collar 17) of a bottle B to be held. Rounded ribs 23, 25 may allow that a bottle may be pulled axially from the bottle holder 3. The ribs 23, 25 are circumferentially curved and contact the bottle neck 13 circumferentially (best seen in FIG. 7). Preferably, as shown, the inner curvature, or rather the inner shape, of the ribs 23, 25 corresponds with the outer shape of the bottle neck 13 so as to provide an optimum form-fit (cf. FIGS. 9-12). The ribs 23, 25 may extend along the neck circumference for a suitable length to provide a secure engagement surface area and sufficient supporting force for carrying the bottle B, e.g. each rib 23 having a circumferential length of about ⅛th or more of an (imaginary) circumference of all ribs 23, 25, corresponding to the bottle neck outer circumferential size and shape directly underneath the collar 17, i.e. at the position of the rib 23 when holding the bottle neck 13. The ribs 23, 25 may extend along the neck in axial direction for a suitable length to provide a secure engagement surface area and sufficient supporting force for carrying the bottle B and preventing undesired tilting of the bottle.

The arms 19, 21 are spaced apart in at least one location, providing an opening arranged to provide the bottle neck 13 access into the holding space H in radial direction relative to the axis A. The arms also have an angled axial end by lead-in surfaces 27, 29 to provide the bottle neck access into the holding space H in axial direction. Thus, the bottle holder 3 and the bottle neck 13 may snap onto each other in both axial and radial direction, for which some force may be required. When thus coupled, the arms 19, 21 of the bottle holder 3 provide an effectively radially inward holding force onto the bottle neck 13 and an engagement with (an underside of) the collar 17 for carrying the bottle B, preferably generally corresponding with the axial and radial shape and flexibility of the arms 19, 21.

At least one of the bottle holders 3, preferably each bottle holder 3, comprises a top cover 33, possibly (for) only partially covering the top of a bottle. The top cover 33 extends from one arm to another one of the arms, thus connecting the arms 19, 21 over the holding space H, across the top and/or generally in axial direction, and over a bottle when held in the bottle holder, providing a gripping force to the arms 19 and a bottle held in the bottle holder 3 in axial direction. The top cover 33 may provide, as shown, a dome-shape to the bottle holder. Thus, the top cover 33 fortifies the bottle holder 3 and increases a holding force of the bottle holder 3 onto a bottle. Note that the length of the bottle holder from a tip of one arm 19 at the opening to the tip of the other arm 19 opposite the opening in circumferential direction along (the arms 19, 21, 19 of) the bottle holder 3 may be significantly longer than the length of the holder from a tip of one arm 19 at the opening to the tip of the other arm 19 opposite the opening along the top cover 33; thus the top cover 33 may provide a stronger clamping force to the arms 19 at or near their tips than the arms 19.

Compared to the carriers of FIGS. 1, 2, 3-12 it may be seen that the carrier of FIG. 1A, e.g., has relatively thicker arms 19 with slightly rounded ribs 23. Thus, strong holding force and reliable bottle positioning and -orienting may be improved. The carrier 1, and in particular the arms 21 thereof, may be solid or, not visible, at least partly hollow. At least in a hollow carrier fortification ribs may be provided on an interior side.

Figure 11:
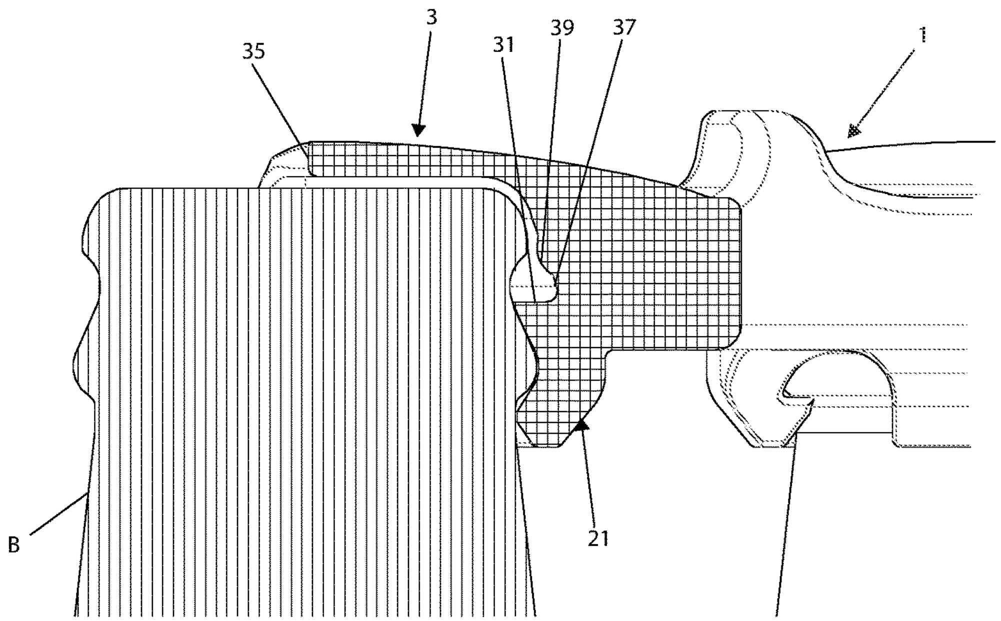
FIG. 11 is a cross section view of a bottle neck held in the bottle holder.
Figure 12:
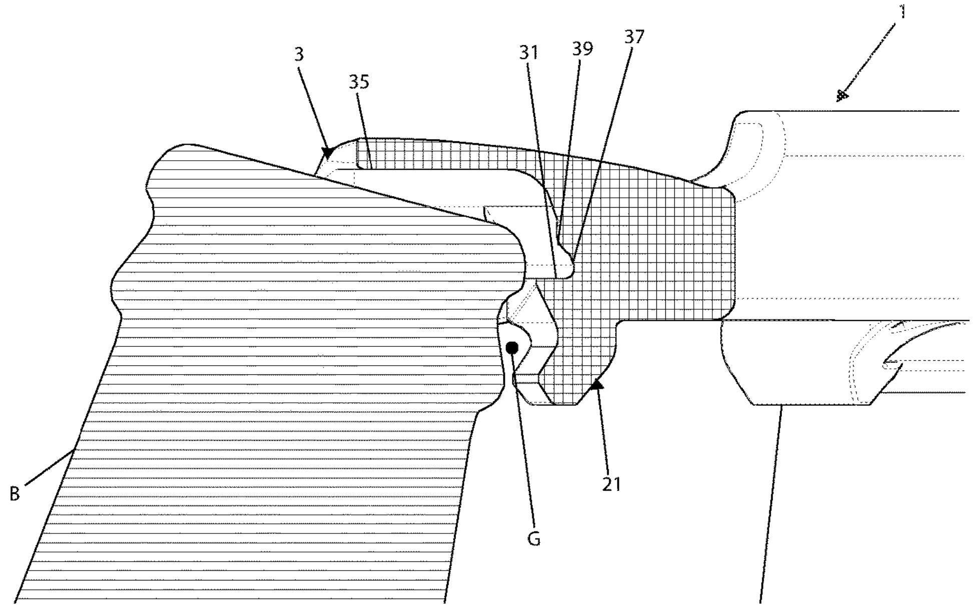
FIG. 12 is a cross section view of a bottle neck held in the bottle holder and being tilted, FIGS. 11 and 12 together indicating opening the bottle.

At least one of the bottle holders 3, preferably each bottle holder 3, comprises an integrated cap lifter, here comprising a curved cap lifting edge 31 best seen in FIGS. 7 and 11-12, and the partial top cover 33 providing a second edge 35, or cap bending edge. The cap lifting edge 31 is axially aligned with the arm 21 (e.g. see FIGS. 5, 7 and 8) and may be integrated with the arm 21 if both (21, 31) are suitably sized. The cap lifting edge 31 has a curvature outward of the holding space H, the direction corresponding to the shape of the bottle neck 13. The radius of curvature of the cap lifting edge 31 is larger than the radius of curvature of the curved contact ribs 23, 25 by a factor of about 1.5-2.5 e.g. 1.9-2.1 times, centered about a center being laterally offset from the axis opposite from the cap lifting edge (e.g. FIG. 7). Best seen in FIGS. 1, 4, 6, is that the cap lifting edge 31 and the second edge 35, or cap bending edge, of the top cover 33 are curved having a curvature in the same direction, but possibly with mutually different radii and/or centers of curvature, as both shown here.

The shown bottle holder 3 is symmetric about a symmetry plane containing the axis A, in particular a plane corresponding to the cutting plane VIII for FIG. 8 as indicated in FIG. 6.

For opening a bottle B held in the bottle holder 3, the bottle B may be tilted (FIGS. 11, 12) relative to (the bottle holder 3 of) the bottle carrier 1. Thus, the cap lifting edge 31 may engage an end, typically one or (preferably) more folds (or: “teeth”, “spikes” or “cleats”) of the crown cap (not shown), and the second edge 35 may engage the cap in axial direction aligned with the wall of the top portion 11. Thus, the cap may be clamped between on the one side the edge 35 and on the other side the top of the bottle wall of the bottle neck 13. Thus, a two-position bending arrangement is provided and the bottle B may rotate about a fulcrum provided by the interaction of the second edge 35 and the cap, whereby the cap lifting edge 31 and the second edge 35 provide an arm for bending the cap and opening the bottle B. It is believed that a curved bending edge 35 simplifies bending the cap and opening the bottle B. Due to the curvature, interaction with a central portion of the cap is reduced. This facilitates bending of the cap along a line of least (bending) resistance, which may or may not be along a straight line between portions of maximum clamping force on the cap between the edge 35 and the top of a bottle wall of the bottle neck 13. At a certain bottle tilt, relative to the axis A (FIG. 12) the bottle neck top portion 11 is urged out of the holding space by (the rib 25 of) the arm 2. This may facilitate bending the cap and therewith opening the bottle B, and removal of the bottle B from the bottle holder 3. The bottle holder 3 may be sized to release the bottle B from the holder 3 and opener at a pre-determined tilting angle, while the opener geometry (31, 35 and their mutual positions, shapes and sizes) retains the cap to some extent, thus separating the cap and the bottle B. A gap G between the side arms 19 and the arm 21 associated with the cap lifter (31, 35) may facilitate individual resilient deformation of the arms 19 and 21 and may allow “tailoring” the force required for opening the bottle B relative to the holding force of the bottle holder 3 for storage and transport of the bottle B. Such resilient deformation and/or force may further be tailored by adjustment of the (relative) shapes and/or sizes and/or of the material(s) of the arms 19, 21 and top cover 33. Note that in FIG. 1A, as an option, the top cover 33 is locally bent relative to a main direction of the arms 19 (indicated at “R”) thus forming a local fortification. Also or alternatively, ribs, webs and/or other structures may be provided.

Without the above-described tilting of the bottle B for opening the cap, the bottle B may be removed from the bottle holder 3 unopened, e.g. by sliding out the bottle B in radial direction. This may be assisted by the cap lifting edge 31 being optionally flat, as shown (e.g. FIG. 11), or sloping downward to some extent. The embodiment of FIG. 1A facilitates such unopened removal by providing optional enlarged front surfaces F of the arms 21 against which a user my place a thumb or finger to provide a counterforce support when pulling out a bottle B from the bottle holder 3.

The recess 37 accommodates at least part of an intact crown cap and deformed portions of a deformed cap. A wall defining the recess 37 and the cap lifting edge 31 continue into each other with a chamfer to reduce stresses (FIGS. 8, 11-12). The recess 37 has a lateral width about equal to or less than the width of the arm 21 with which the recess is axially aligned, so that strength of the arm 21 is maintained (FIG. 5).

Beset seen in FIG. 5, the bottle holder 3 comprises optionally at least one radial inward protrusion 39 for engaging and/or interlocking with a cap of a bottle held in the bottle holder; a crown cap allows insertion of the protrusion 39 between folds (or: “teeth”) of the cap, thus hindering rotation of the cap, and therewith of the bottle B, relative to the carrier 1. This may assist providing a desired consistent advertisement display with all bottles facing in a particular direction.

Figure 13:
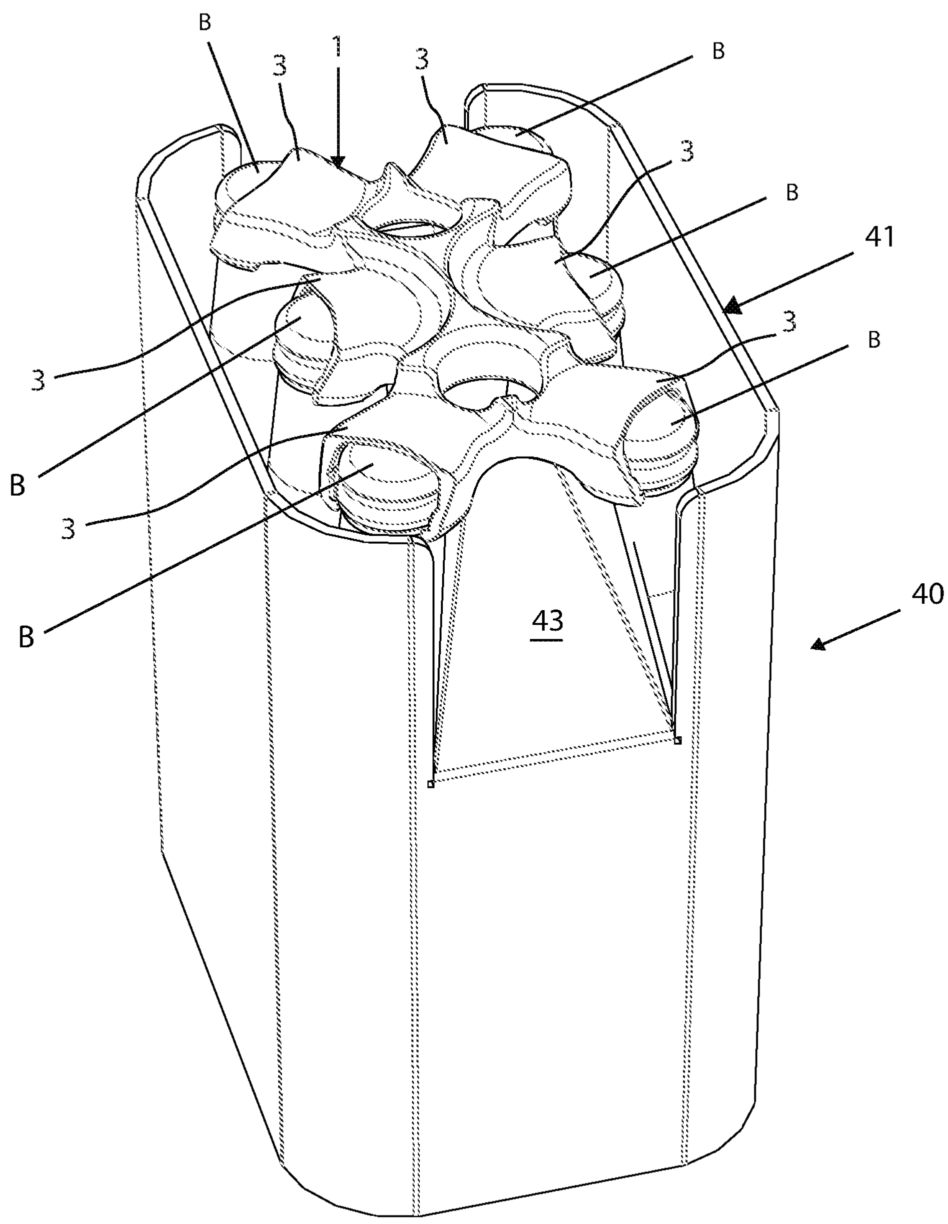
FIG. 13 is a perspective view of an assembly comprising the bottle carrier and a number of bottles in a packaging wrap.

FIG. 13 shows an assembly 40 comprising the bottle carrier 1 of FIG. 1 and a number of bottles B held in bottle holders of the carrier 1, further comprising a packaging wrap 41 around the bottles. The packaging wrap 41 comprises one or more resilient members 43 engaging part of the bottle carrier 1 for fixing the wrap 41 relative to at least one of the bottle carrier 1 and one or more of the bottles B. In addition to or instead of a resilient member 43, a wrap (not shown) may comprise flaps on an inside of the wrap to protrude inwardly and extend underneath the carrier and/or between bottles held in the carrier. Other at least temporary fixations of a wrap relative to a carrier and/or bottles held therein may also be used.

The packaging wrap 41 around the bottles B prohibits unintended bottle opening and/or bottle tilt during transport and/or storage. When opaque, it may prevent e.g. beer from light struck. Further, he packaging wrap protects held bottles, e.g. glass bottles, from damage and/or dirt during transport. The packaging wrap 41 may have at one or (preferably) more locations an indent to hook underneath the carrier 1 and to allow/provide a stable contact between the packaging wrap 41 and the carrier 1, enabling the assembly to be lifted/carried by holding only the packaging. The packaging wrap 41 in combination with the carrier 1 introduces the possibility to realise a packaging with minimal use of packaging materials (e.g. the packaging wrap 41 not requiring a top and/or a bottom). This results in a packaging wrap 41 without the necessity to fold the material in 90 degrees or in angled/straight lines as needed for folding a box. Furthermore, the packaging wrap 41 allows for a distinct form factor of large radius along the vertical outer corner bottles, creating a large plain commercial branding area.

The packaging wrap 41 can also be used to return the empty bottles B and/or repack/store remaining unopened bottles B due to the fact that it is not mandatory to break or tear open the packaging wrap 41 to access the bottles B; the (sub-) assembly of carrier 1 and bottles B may be pulled/pushed up relative to the carrier (or the wrap 41 be pulled/pushed down relative to the carrier), this will slide the wrap 41 from the assembly 40, if no adhesives or the like are used.

Best visible in FIGS. 1 and 13, the bottle carrier 1 comprises an upper side provided with a stacking profile, the stacking profile comprising one or more relative protrusions 45 and recesses 47 for engaging and at least partly defining a position of a bottle bottom placed onto the upper surface. The top covers 33 may also be formed, as shown, for being part of the stacking profile. Here, e.g. the stop portions are at least partly protruding upward corresponding to hollowed bottoms ("kicked" bottoms) of bottles to be held. Thus, the carrier 1 provides a stacking geometry to position a next assembly (or: "bottle pack") on top of another by guiding the bottle lower diameter and by supporting an optional bottle kick. A bottle carrier for 3, 4 or more bottles B (not shown) facilitates stacking up two layers op top of each other for e.g. large fridge or shop display storage. A bottle carrier for 6 bottles (FIGS. 1, 13) or for more bottles (e.g. FIG. 2) may also facilitate stacking bottle packs in different rotational orientations ("brick laying stacking") and build multiple layers of bottles on top of each other for e.g. larger storage volumes and/or on pallets. This also holds for the bottle carrier 100 (FIG. 2), wherein the handle 9 is formed for at least not impairing stacking and preferably assisting a stacking profile (not shown).

The bottle carriers 1, 1A 100, allow stacking with capped bottles, with uncapped bottles and with mixtures of capped and uncapped bottles within one or more of the carriers being stacked.

The disclosure is not restricted to the above described embodiments which can be varied in a number of ways within the scope of the claims. For instance, the cap lifting edge could be formed of a different material, e.g. a metallic piece, to further increase robustness.

Elements and aspects discussed for or in relation with a particular embodiment may be suitably combined with elements and aspects of other embodiments, unless explicitly stated otherwise.

The invention claimed is:

1. A bottle carrier for carrying plural bottles, each bottle having a bottle neck with a bead upon which a cap is joined, a waist between the bead and a collar, wherein the waist is of smaller diameter than the bead and the collar, the bottle carrier comprising a plurality of connected bottle holders for each holding a bottle along an axis of extension, each bottle holder comprising at least three resilient arms defining a holding space, each arm configured to engage and hold the bottle neck and to support the bottle by the collar, and wherein the arms are arranged to provide the bottle neck access into the holding space in a radial direction and to provide an effectively radially inward holding force onto the bottle neck, and wherein at least one of the bottle holders comprises an integrated cap lifter.

2. The bottle carrier according to claim 1, wherein in at least one of the bottle holders at least one of the arms provides an angled axial end to provide the bottle neck access into the holding space in axial direction.

3. The bottle carrier according to claim 1, wherein in at least one of the bottle holders at least one of the arms comprises at least one of a circumferentially curved contact rib about the axis and a series of protrusions providing a circumferentially curved contact trace.

4. The bottle carrier according to claim 3, wherein the cap lifter comprises a curved cap lifting edge having a radius of curvature in a plane perpendicular to the axis larger than a radius of curvature of the bottle neck by a factor in a range of 1.25-5 times a radius of curvature of the curved contact rib and/or the circumferentially curved contact trace provided by the series of protrusions.

5. The bottle carrier according to claim 1, wherein at least one of the bottle holders comprising an integrated cap lifter enables selective removal of a bottle held therein unopened or including opening.

6. The bottle carrier according to claim 1, wherein the cap lifter comprises a curved cap lifting edge having a curvature outward of the holding space.

7. The bottle carrier according to claim 5, wherein the cap lifting edge is axially aligned with one of the arms and/or integrated in one of the arms.

8. The bottle carrier according to claim 6, comprising a recess bordering the cap lifting edge for accommodating a cap crown and/or a bottle rim of a tilted bottle top in the holding space.

9. The bottle carrier according to claim 1, wherein the cap lifter comprises a curved cap lifting edge having a radius of curvature in a plane perpendicular to the axis larger than a radius of curvature of the bottle neck.

10. The bottle carrier according to claim 9, wherein the radius of curvature of the curved cap lifting edge is larger than the radius of curvature of the bottle neck by a factor in a range of 1.25-5 times the radius of the bottle neck at a location at or just below the cap.

11. The bottle carrier according to claim 1, wherein each bottle holder comprises an at least partial top cover.

12. The bottle carrier according to claim 11, wherein the at least partial top cover extends from one of the arms to another one of the arms thus connecting the arms over the holding space and/or generally in axial direction, and a least partially over a top of a bottle when held in the bottle holder.

13. The bottle carrier according to claim 11, wherein the at least partial top cover provides at least one of an edge or rib and contact portions on opposite sides of the axis, wherein the edge or rib and/or contact portions, where applicable, are arranged for engaging a cap of a capped bottle in the bottle holder in axial direction aligned with a bottle wall, thus enabling clamping the cap in axial direction between on the one side the edge or rib and/or contact portion and on the other side the bottle wall.

14. The bottle carrier according to claim 13, wherein the cap lifter comprises a curved cap lifting edge having a curvature outward of the holding space, and wherein the edge or rib is curved, having a curvature in a direction of the cap lifting edge.

15. The bottle carrier according to claim 11, wherein each bottle holder comprises at least one radial inward protrusion for engaging and/or interlocking with a cap of a bottle held in the bottle holder.

16. The bottle carrier according to claim 11, wherein the bottle carrier comprises an upper side provided with a stacking profile, the stacking profile comprising one or more of protrusions and recesses for engaging and at least partly defining a position of a bottle bottom placed onto the upper side.

17. The bottle carrier according to claim 11, wherein the bottle carrier comprises a hand grip.

18. The bottle carrier according to claim 1, further comprising a number of bottles held in the bottle holders of the bottle carrier.

19. The bottle carrier according to claim 18, further comprising a packaging wrap around at least some of the bottles.

20. The bottle carrier according to claim 1, wherein the arms are arranged to provide the bottle neck access into the holding space in the radial direction for snapping the bottle holder onto the bottle neck by relative movement in the radial direction.

21. A bottle carrier for carrying plural bottles, each bottle having a bottle neck with a bead upon which a cap is joined, a waist between the bead and a collar, wherein the waist is of smaller diameter than the bead and the collar, the bottle carrier comprising a plurality of connected bottle holders for each holding a bottle along an axis of extension, each bottle holder comprising at least three resilient arms defining a holding space, each arm configured to engage and hold the bottle neck and to support the bottle by the collar, and wherein the arms are arranged to provide the bottle neck access into the holding space in a radial direction and to provide an effectively radially inward holding force onto the bottle neck, and wherein one of the arms of at least one of the bottle holders comprises an integrated cap lifter at a location on said one of the arms apart from a portion configured to contact the collar.

22. A bottle carrier for carrying plural bottles, each bottle having a bottle neck with a collar, the bottle carrier comprising a plurality of connected bottle holders for each holding a bottle along an axis of extension, each bottle holder comprising at least three resilient arms defining a holding space, each arm configured to engage and hold the bottle neck and to support the bottle by the collar, wherein the arms are arranged to provide the bottle neck access into the holding space in a radial direction and to provide an effectively radially inward holding force onto the bottle neck, and wherein one of the arms of at least one of the bottle holders comprises an integrated cap lifter at a location on said one of the arms apart from a portion configured to contact the collar.

* * * * *